Patented Apr. 17, 1945

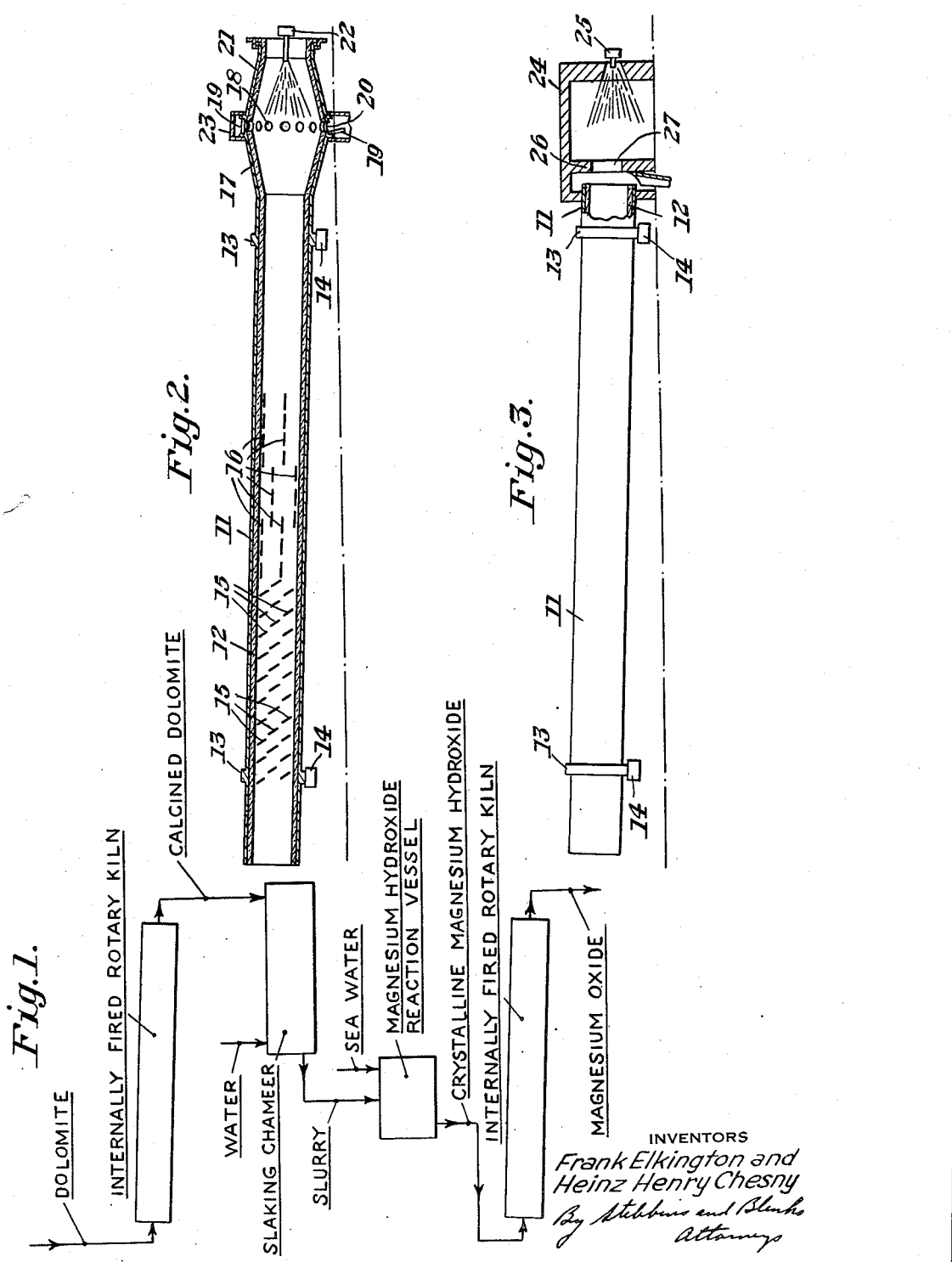

2,373,749

UNITED STATES PATENT OFFICE 2,373,749

APPARATUS FOR THE MANUFACTURE OF MAGNESIUM OXIDE

Frank Elkington, Sheffield, England, and Heinz Henry Chesny, West Los Angeles, Calif.

Original application February 28, 1940, Serial No. 321,274. Divided and this application April 4, 1942, Serial No. 437,664. In Great Britain May 31, 1939

2 Claims. (Cl. 23—279)

The present invention relates to apparatus for the manufacture of magnesium oxide and is particularly useful in the manufacture of a reactive magnesium oxide. However, it will be apparent to those skilled in the art that the apparatus which we have provided can be used in the calcination or burning of various materials.

The present application is a division of our application Serial No. 321,274, filed February 28, 1940.

It is known to prepare magnesium hydroxide by reacting together an aqueous slurry of calcined and slaked dolomite and a dilute brine such as sea water in order to form magnesium hydroxide and various proposals have been made for controlling the conditions of the reaction so that the magnesium hydroxide is obtained in the desired physical form. The magnesium hydroxide may be converted into magnesium oxide by a process of calcination and may be converted into other magnesium compounds. In particular it has been proposed to wash a slurry of magnesium hydroxide and to subject the washed slurry to spray drying in order to produce a dry powder of magnesium hydroxide without interfering with the amorphous nature of the precipitate. By introducing the finely divided magnesium hydroxide into an externally fired rotary retort and calcining it for a period of six to ten minutes at a temperature of 400° C., a product containing 70.84% MgO is obtained, the remainder of the product consisting of 14.38% magnesium hydroxide, carbonates, sulphates and impurities. The magnesium oxide thus obtained possesses physical activity in that it is capable of absorbing coloring matter with great readiness.

The present invention provides an apparatus which is highly desirable in the economical production of reactive magnesium oxide by the interaction of an aqueous slurry of calcined and slaked dolomite and diluted aqueous brine such as sea water. The resulting product is particularly suitable for the manufacture of metallic magnesium and for the production of magnesia cement.

As employed herein and applied to magnesium oxide, the term "reactive" is intended to denote a magnesium oxide which possesses the property of setting rapidly when mixed with magnesium chloride solution to form a magnesia cement. The degree of reactivity is dependent upon the conditions prevailing during the passage of the material through the kiln and upon the extent to which the magnesium hydroxide is converted into magnesium oxide.

In our application Ser. No. 321,274, a process for the production of reactive magnesium oxide is disclosed fully. That process comprises treating an aqueous slurry of calcined and slaked dolomite with a dilute aqueous brine such as sea water to form a crystal magnesium hydroxide, removing the magnesium hydroxide from the liquid and introducing it while in the wet state into an internally fired rotary kiln and calcining it at a temperature of the order of 850° C. to 1000° C. for a period of the order of one to two hours. We have found that in order to produce a reactive material, it is highly essential that the calcination be carried out while the material is substantially out of contact with the flame itself. Accordingly, the principal object of the present invention is to provide a suitable combination rotary kiln and combustion furnace in which coal, oil or gas is burned under conditions giving a very high temperature such as 1400° C. and over and in which the calcination can be carried out without bringing the material into contact with the flame.

We have also found that the gaseous mixture must be relatively low in residual oxygen and consequently it is one of the objects of this invention to provide a kiln which is of such character that proper combustion can be obtained without any appreciable quantity of residual oxygen being brought into contact with the material. We have found it desirable to use a kiln in which the hot gases can be introduced therein at a temperature of 850° C. to 1000° C. and will, during their passage through the kiln, cool appreciably so that when discharged from the exit end, they will have a temperature in the neighborhood of 200° C.

The crystalline magnesium hydroxide is introduced in the form of a slurry containing about 20% to 25% $Mg(OH)_2$ into the upper end of the inclined kiln. The initial drying action causes the formation of a very stiff, gum-like mass and it is essential to provide means of breaking up this mass into small and uniformly sized pieces. For this purpose cutting blades, attached to the sides of the kiln and disposed at an angle of about 16° from the vertical are provided. The length of the portion of the kiln fitted with these cutting blades is so arranged that all the material is cut into masses from one inch to two inches in diameter. Subsequently, the material is passed into a zone in the kiln in which lifting troughs disposed slightly inclined in relation to the axis of the kiln are provided. These lifters serve the purpose of picking up the partially calcined material and dropping it through the stream of hot gases. It is necessary to provide mechanical means for bringing the material into contact with the gas stream in order to obtain a uniform and reactive material.

The length, the angle of inclination and the speed of rotation of the kiln, are so selected that the material passes through the kiln within a period of from one to two hours. The last section at the lower end of the kiln is free from any mechanical means for distributing the material. The rate of movement of the material along the kiln is so governed that the material is moved rapidly towards the zone of maximum temperature.

In a modification of the invention, the magnesium hydroxide slurry is dried in a suitable dryer, such as a tray dryer, which affords a relatively slow drying action. Thus, small lumps of magnesium hydroxide, which may still contain a substantial proportion of free water are formed. Subsequently, the dried lumps are introduced into a rotary kiln, such as described above.

The most reactive material contains, on an impurity-free basis, from 10% to 50% MgO and from 90% to 50% $Mg(OH)_2$. Thus, one example of a product made in accordance with the present invention had the following analysis:

| | |
|---|---|
| MgO | 28.0 |
| $Mg(OH)_2$ | 69.4 |
| CaO | 1.2 |
| $SiO_2$ | 0.7 |
| $Al_2O_3$ | 0.3 |
| $Fe_2O_3$ | 0.4 |
| | 100.0 |

This is equivalent to 76.0% of MgO.

When mixed with magnesium chloride solution (S. G. 1.25) in the proportion of 100 grams of magnesium oxide equivalent to 125 cubic centimeters of magnesium chloride solution, this material gives an initial set on a standard Vicat apparatus in 10 to 15 minutes and sets up as a hard cement within 50 to 80 minutes. It has been found that such a product is eminently suited to the production of metallic magnesium.

In the accompanying drawing we have shown for purposes of illustration only, a preferred embodiment and one modified form of kiln embodying our invention. We have also shown diagrammatically a process in which our apparatus is particularly useful. In the drawing, Figure 1 is a flow sheet of the process whereby dolomite is calcined by being passed through a kiln, the calcined material slaked with water and then converted to a slurry which is reacted with sea water to form a crystalline magnesium hydroxide and the magnesium hydroxide converted to magnesium oxide by passage through an internally fired rotary kiln embodying our invention;

Figure 2 is a section through a preferred embodiment of our invention; and

Figure 3 is a sectional view of a modified form of rotary kiln provided by our invention.

Referring to Figures 2 and 3, the inclined rotary kiln consists of a shell 11 which is lined with refractory brickwork 12. The kiln is supported on bearing rings 13 running on rollers 14 and is provided with cutting blades 15 attached to the wall of the kiln and inclined at an angle of e. g. 16° to the vertical. These blades have the effect of breaking up the partially dried magnesium hydroxide slurry. After passing the zone of the kiln provided with cutting blades the material passes a series of lifting blades 16 adapted to lift the material and to drop it through the body of hot gases passing through the kiln. The lifting blades are only slightly inclined to the horizontal and are preferably slightly curved so as to retain the material until it reaches a point near the top of the kiln before being dropped. The upper and lower ends of the kiln are preferably free from mechanical means for cutting or lifting the material.

Referring to Figure 2, the lower end of the kiln is flared at 17 in order that the calcined material may pass quickly through the hottest zone of the kiln to radially disposed holes or slots 18 provided with flap valves 19 lined with refractory material and arranged to open automatically (as at 20) when at the underside of the kiln. The remainder of the kiln is tapered at 21 towards the burner 22. A hood 23 is arranged over the central portion of the burning zone containing the valves 19 so as to provide a reasonably tight seal to prevent inward leakage of air or outward leakage of combustion gases. The hood 23 is also provided with an opening at the bottom (not shown) for the discharge of the calcined material.

Referring to Figure 3, the lower end of the rotary kiln is connected to one end of a stationary combustion furnace 24. An oil, gas or pulverized coal burner 25 is provided at the opposite end of the combustion furnace 24. The furnace has a firing wall 26 for the purpose of preventing the flame from the furnace from passing into the rotary kiln itself. A circular hole 27 of a diameter approximately equal to the inside diameter of the kiln is arranged in the firing wall 26 and the hot combustion gases pass from the furnace through this hole and enter the kiln.

Suitable brick receiving chambers may be provided at the feed end of the kiln and may be connected either to a chimney or to a fan creating the necessary suction.

A slurry of crystalline magnesium hydroxide obtained by the interaction of sea water and a slurry of calcined and slaked dolomite and containing, for example, per litre of slurry:

| | Grammes |
|---|---|
| Magnesium hydroxide | 300 |
| Calcium sulphate | 0.5 |
| Calcium chloride | 0.7 |
| Calcium silicate | 3.0 |
| Iron oxide | 1.5 |
| Aluminum oxide | 1.0 |
| Calcium carbonate | 0.07 |
| Sodium chloride | 0.3 | is fed at an even rate into a slowly revolving rotary kiln of the type shown in Figure 2 or Figure 3.

In the furnace shown in Figure 3 heat is obtained by the combustion of coal, oil or gas in a stationary combustion furnace 24, the temperature of the latter being maintained at 1250° to 1450° C. The hot combustion gases from the furnace 24 enter the rotary kiln 11 at a temperature of 850° C. Draught is applied to the rotary kiln by means of a stack or a fan for the purpose of drawing the gaseous mixture through the kiln at a velocity sufficiently high to heat the slurry and the solids resulting therefrom but not sufficiently high to pick up solid material in the gas stream. Depending upon the length of the kiln, the temperature conditions are adjusted so that the temperature at the feed end of the kiln, i. e. the gas exit end, lies in the range of 150° to 250° C.

Alternatively, we may employ a rotary kiln having a flared firing section lined with refractory brickwork and fire directly into the kiln as shown in Figure 2. It is the purpose of the flared end section 17 to support the combustion of the fuel, viz. powdered coal or oil, by the heat retained by and radiated in this section. As it is of great importance that the calcined material should not be subjected to direct flame, the flared section 17 permits very rapid passage of the material through the hot zone. Thus, we are able to calcine the magnesium hydroxide at a relatively low temperature while maintaining the flared section 17 at a temperature sufficiently high to ignite and properly burn the fuel.

The rate of feeding and the rate of rotation of the kiln are adjusted so that the material passes through the entire length of the kiln within a period of time ranging from one to two hours.

We claim:

1. Apparatus for the production of magnesium oxide from magnesium hydroxide comprising an internally-fired inclined rotary kiln the lower and firing end of which is flared and subsequently tapered to the burner, the portion joining the flared and tapered sections of the kiln being apertured for the removal of calcined material from the kiln, each aperture being provided with a refractory-lined flap valve which opens automatically when the aperture with which it is associated is at the underside of the kiln.

2. Apparatus as claimed in claim 1 wherein the apertured portion of the kiln is provided with a substantially gas-tight hood preventing leakage of air into or combustion gases out of the kiln.

FRANK ELKINGTON.
HEINZ HENRY CHESNY.